United States Patent
Gould et al.

(10) Patent No.: US 10,868,320 B2
(45) Date of Patent: Dec. 15, 2020

(54) STACKLESS FUEL CELL

(71) Applicants: Benjamin D. Gould, Alexandria, VA (US); Joseph Rodgers, Jessup, MD (US); Richard Stroman, Washington, DC (US); Matthew Hazard, Washington, DC (US)

(72) Inventors: Benjamin D. Gould, Alexandria, VA (US); Joseph Rodgers, Jessup, MD (US); Richard Stroman, Washington, DC (US); Matthew Hazard, Washington, DC (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/861,809

(22) Filed: Sep. 22, 2015

(65) Prior Publication Data
US 2016/0087300 A1    Mar. 24, 2016

Related U.S. Application Data

(60) Provisional application No. 62/054,203, filed on Sep. 23, 2014.

(51) Int. Cl.
*H01M 8/10* (2016.01)
*H01M 8/1004* (2016.01)
(Continued)

(52) U.S. Cl.
CPC ........ *H01M 8/1004* (2013.01); *H01M 8/0269* (2013.01); *H01M 2008/1095* (2013.01)

(58) Field of Classification Search
CPC ....... H01M 2008/1095; H01M 8/1004; H01M 8/0269
(Continued)

(56) References Cited

U.S. PATENT DOCUMENTS

| 6,326,554 B1 * | 12/2001 | Gillette | H05K 1/141 |
| | | | 174/254 |
| 8,067,128 B2 | 11/2011 | Cui et al. | |

(Continued)

OTHER PUBLICATIONS

"http://www.dupont.com/content/dam/dupont/products-and-services/electronic-and-electrical-materials/flexible-rigid-flex-circuit-materials/documents/PyraluxLFbondply DataSheet.pdf" accessed on Aug. 18, 2017.*

*Primary Examiner* — Jonathan G Jelsma
*Assistant Examiner* — Omar M Kekia
(74) *Attorney, Agent, or Firm* — US Naval Research Laboratory; Richard Bis

(57) ABSTRACT

A fuel cell includes a catalyst coated membrane with a proton exchange membrane, a cathode layer disposed on a first surface of the proton exchange membrane, and an anode layer disposed on an oppositely disposed second surface of the proton exchange membrane. At least one gas diffusion layer is bonded to at least one of the cathode and anode layers of the catalyst coated membrane. At least one bonding layer substantially surrounds at least one of the catalyst coated membrane and the at least one gas diffusion layer. The at least one bonding layer is bonded to a portion of the proton exchange membrane. At least one circuit is bonded to a portion of the gas diffusion layer and a portion of the at least one bonding layer.

19 Claims, 12 Drawing Sheets

(51) Int. Cl.
*H01M 8/1018* (2016.01)
*H01M 8/0202* (2016.01)

(58) Field of Classification Search
USPC .............................................. 429/481; 156/60
See application file for complete search history.

(56) References Cited

U.S. PATENT DOCUMENTS

| | | | |
|---|---|---|---|
| 8,201,773 B1 | 6/2012 | Durham et al. | |
| 2003/0049518 A1 | 3/2003 | Nanaumi et al. | |
| 2004/0013930 A1* | 1/2004 | Pan ..................... | H01M 4/8605 429/492 |
| 2004/0254294 A1* | 12/2004 | Clulow ............... | H01M 8/0297 524/599 |
| 2005/0197246 A1 | 9/2005 | Yoshida et al. | |
| 2009/0087713 A1 | 4/2009 | Yoshida et al. | |
| 2011/0076592 A1* | 3/2011 | Yamauchi ........... | H01M 4/8605 429/480 |
| 2012/0126828 A1* | 5/2012 | Cohen .................... | A61B 5/053 324/629 |
| 2013/0040221 A1* | 2/2013 | Sekine ................ | H01M 4/8605 429/480 |
| 2013/0224623 A1* | 8/2013 | Barnwell ............ | H01M 8/0273 429/482 |

\* cited by examiner

STACKLESS FUEL CELL

RELATED APPLICATIONS

The present application is related to, and claims the benefit of priority to, U.S. Provisional Patent Application No. 62/054,203, entitled STACKLESS FUEL CELL IN A PLANAR ARRAY COMPOSED OF FLEXIBLE PRINTED CIRCUIT BOARDS GAS DIFFUSION LAYERS AND CATALYST COATED MEMBRANE, filed on Sep. 23, 2014, having at least two of the same inventors Benjamin D. Gould and Joseph A. Rodgers and assigned to the U.S. Government, as the present disclosure, and is herein incorporated by reference in its entirety.

FIELD OF THE DISCLOSURE

The present disclosure relates to generation of electrical power, using fuel cells. More particularly, the proposed technology creates a stackless, planar array fuel cell through the combination of flex circuits, catalyst coated membranes, and gas diffusion layers bonded into a single, laminated power producing unit.

BACKGROUND OF THE DISCLOSURE

Proton exchange membrane fuel cells are devices used to generate electrical power from the reaction of hydrogen with oxygen. In a typical proton exchange fuel cell, hydrogen gas (which serves as fuel for the fuel cell and an associated vehicle, such as an airplane) is dissociated to form two protons and two electrons at an anode side of a catalyst coated membrane. The protons migrate through the membrane to react with one oxygen atom on a cathode side of the catalyst coated membrane. The remaining two electrons pass through an external circuit to provide electromotive force and complete the reaction with oxygen to form water and heat.

These typical fuel cells employ a stack topology to increase the operating voltage by placing multiple cells in series. In a stacked arrangement, the proton exchange membranes are sandwiched between current collecting bipolar plates. Gas channels in the plates allow hydrogen and air to diffuse to the anode and cathode of the membranes, generating electricity which is collected at the ends of the "stack."

Water generated in the electrochemical reaction must be removed from the cells to allow gas to diffuse into each membrane's reaction sites. Air pumped through each cathode provides oxygen for the reaction and removes excess water. Hydrogen must be supplied to each anode to replace what is consumed by the reaction. To remove excess water on the hydrogen side, some fuel cells employ recirculation pumps or occasionally purge the hydrogen side to the atmosphere. The heat from the reaction must be transferred to the bipolar plates and dissipated, typically using a coolant fluid flowing in separate channels inside the plate itself. Thus each bipolar plate contains channels for hydrogen, air, and water coolant, resulting in constricted flow geometries and additional weight. Maintaining separation between the working fluids requires special gaskets which add weight and complexity. Also included in the balance of plant are the air and coolant pumps, coolant fluid and radiator, humidification control systems, and hydrogen storage tank. Most of these components introduce additional losses (electrical or fluid-dynamic), which decrease the efficiency of the system.

SUMMARY OF THE DISCLOSURE

In one embodiment, a fuel cell includes a catalyst coated membrane with a proton exchange membrane, a cathode layer disposed on a first surface of the proton exchange membrane, and an anode layer disposed on an oppositely disposed second surface of the proton exchange membrane. At least one gas diffusion layer is bonded to at least one of the cathode and anode layers of the catalyst coated membrane. At least one bonding layer substantially surrounds at least one of the catalyst coated membrane and the at least one gas diffusion layer. The at least one bonding layer is bonded to a portion of the proton exchange membrane. At least one circuit is bonded to a portion of the gas diffusion layer and a portion of the at least one bonding layer.

In another embodiment, a fuel cell includes an integrated catalyst coated membrane layer which includes a catalyst coated membrane layer, having a proton exchange membrane; a cathode catalyst layer formed onto a portion of the proton exchange membrane; and an anode catalyst layer formed onto a portion of the proton exchange membrane. The integrated catalyst coated membrane layer also includes at least one flex circuit embedded within at least a portion of the proton exchange membrane. The at least flex circuit includes at least one gold-coated copper layer and a polyimide layer bonded to the at least one gold-coated copper layer. At least one gas diffusion layer is disposed bonded to a portion of least one of the cathode layer, the anode layer, and the at least one flex circuit. At least one bonding layer substantially surrounds at least one of the integrated catalyst coated membrane and the at least one gas diffusion layer. The at least one bonding layer is bonded to a portion of the proton exchange membrane.

In another embodiment, a method of manufacturing a fuel cell is provided. The method includes: forming a catalyst coated membrane having a cathode layer and an anode layer attached to opposing surfaces of a proton exchange membrane bonding at least one gas diffusion layer to at least one of the cathode layer and the anode layer; bonding at least one gas diffusion layer to a portion of at least one circuit; bonding at least one bonding layer to a portion of the proton exchange membrane such that the at least one bonding layer substantially surrounds at least one of the cathode layer, and the anode layer; and bonding the at least one circuit to a portion of the at least one bonding layer such that: the at least one gas diffusion layer is disposed on at least one of the cathode layer and the anode layer; and the at least one bonding layer substantially surrounds the at least one gas diffusion layer.

DETAILED DESCRIPTION OF THE DISCLOSURE

Figure 1:
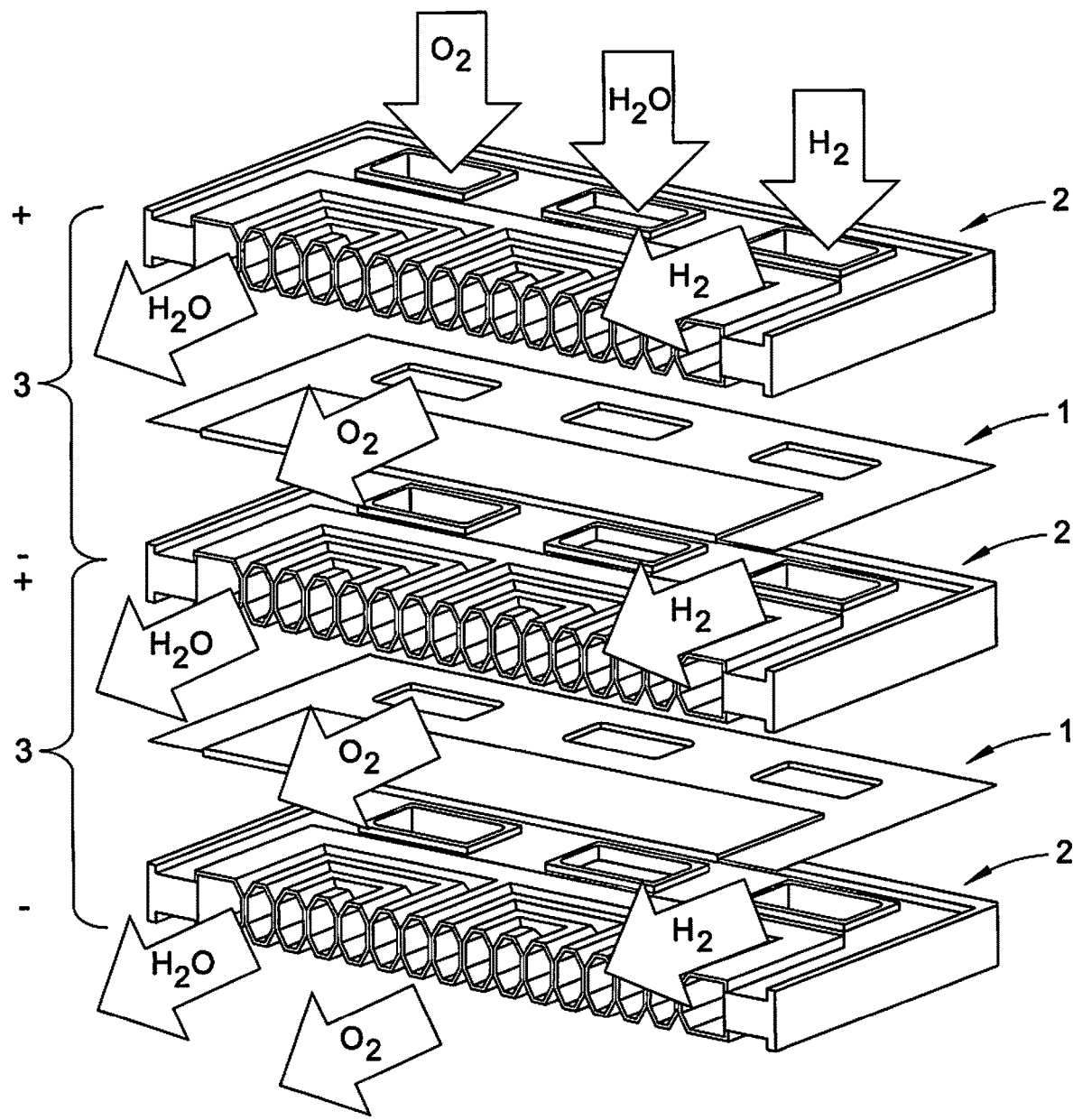
FIG. 1 shows a typical fuel cell assembly known in the art.

FIG. 1 shows a typical fuel cell stack configuration known to those skilled in the art. In this configuration, individual cells are comprised of at least one membrane electrode assembly (MEA) 1 sandwiched by two bipolar plates (BPP) 2 on either side thereof. This unit then repeats though space to form a stack of any number ("n-number") of fuel cells 3. The BPPs 2 serve many purposes in the stack, such as: (1) serving as the primary structural element of the stack providing strength and rigidity to the system for sealing and assembly; (2) separating and directing the flow of the fuel ($H_2$) which is driven to the electrode assembly by a pump (not shown) connected to a fuel tank (not shown), the oxidizer $O_2$ which is drawn in from the air, and the coolant ($H_2O$); and (3) providing electrical conductivity between the cells. Typical stacked fuel cells include other components, such as air blowers, coolant pumps, radiators, and humidifiers (among others) to ensure proper operation of the fuel cells. However, these components provide extra bulk and weight, thereby increasing the mass and cost of the stacked fuel cell arrangement.

The objective of this disclosure is to create ultra-lightweight fuel cells by eliminating the balance of plant (e.g., the air blowers, coolant pumps, radiators, and humidifiers) required in common stacked, proton exchange membrane fuel cell topologies, such as the configuration shown in FIG. 1. This technology features unique combination of flexible circuits, catalyst coated membranes (CCM), and gas diffusion layers (GDL) bonded into a single power-producing layer. These individual cells can be wired in series and/or parallel into a planar array. With hydrogen provided on the anode and oxygen provided by air on the cathode, the array would generate electrical power while eliminating most of the balance of the plant components, thereby advantageously reducing the weight and cost of making the fuel cell assembly, while increasing the efficiency thereof.

Figure 2:
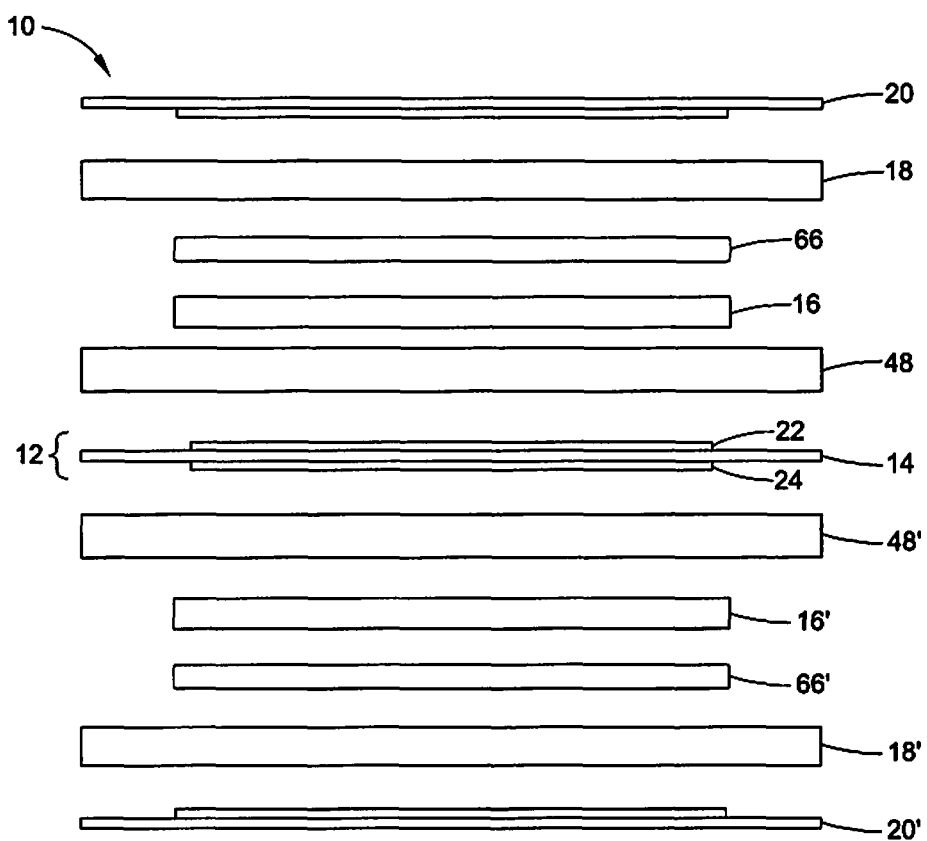
FIG. 2 shows an assembly view of one embodiment of a fuel cell in accordance with one aspect of the present disclosure.

The present disclosure creates a stackless, planar array fuel cell through a design including at least a combination of a flex circuits, a catalyst coated membrane, and a gas diffusion layer into a single, laminated power producing unit. This fuel cell arrangement achieves an increase in electrical power output, along with a reduction in weight and size, by eliminating the need for a multiplicity of parts and complexity of configurations. In addition, the manufacturing process for stackless fuel cells is much less complicated than conventional fuel cell manufacturing operations. These fuel cells can have a size of approximately 10 cubic centimeters (i.e., approximately 0.61 cubic inches). As shown in FIG. 2, a stackless, planar array fuel cell 10 can include a catalyst coated membrane (CCM) 12 with a proton exchange membrane (PEM) 14, at least one gas diffusion layer (GDL) 16, at least one bonding layer 18, and at least one circuit 20. Each of these components of the fuel cell 10 is described in turn.

Figure 3:
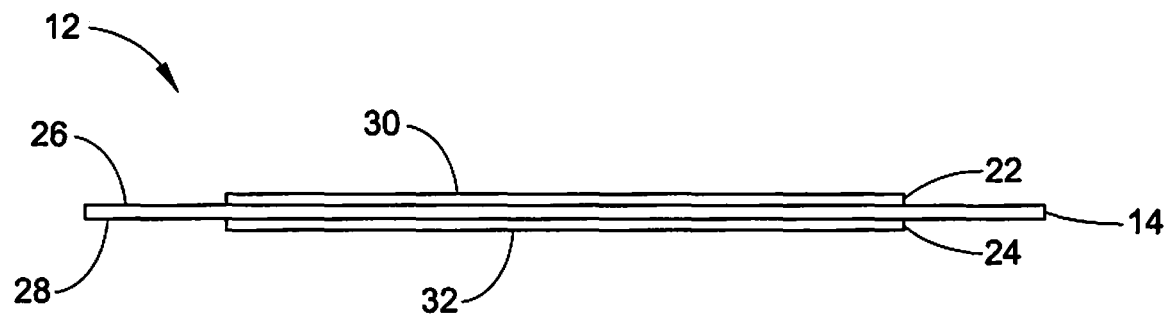
FIG. 3 shows a component of the fuel cell of FIG. 2.

FIG. 3 shows an embodiment of the CCM 12. The CCM 12 includes the PEM 14, a cathode catalyst layer 22, and an anode catalyst layer 24. As shown in FIG. 3, the PEM 14 has a substantially rectangular shape (e.g., a length of approximately 3.48 inches and a width of approximately 3.00 inches). However, the PEM 14 can have any suitable shape (square, circular, elliptical, n-sided polygonal, and the like). The PEM 14 includes a first surface 26 (e.g., a top surface) and an oppositely disposed second surface 28 (e.g., a bottom surface). The PEM 14 can be substantially planar (i.e., smooth). The PEM 14 can be made from perfluorosulfonic acid (PFSA), such as a cast NAFION™ solution (available from DuPont, Wilmington Del.). Advantageously, the cast NAFION™ helps hydrogen ion transport, for example, from the circuit 20 to the GDL 16, as described in more detail below. It will be appreciated that the PEM 14 can be made from any suitable PFSA, or any other suitable material.

As shown in FIG. 3, the cathode layer 22 and the anode layer 24 each have a substantially square shape (e.g., a length of approximately 1.32 inches and a width of approximately 1.30 inches). However, the cathode layer 22 and the anode layer 24 can have any suitable shape (rectangular, circular, elliptical, n-sided polygonal, and the like). The cathode layer 22 and the anode layer 24 can each be substantially planar (i.e., smooth). As described in more detail below, the cathode layer 22 is configured to facilitate an oxygen reduction reaction, and the anode layer 24 is configured to facilitate a hydrogen-oxidation reaction. To do so, the cathode and anode layers 22 and 24 are each made from platinum nano-particles with a carbon support. However, any other suitable material may be used to form the cathode and anode layers 22 and 24.

Referring back to FIG. 2, and with continuing reference to FIG. 3, the cathode and anode layers 22 and 24 are attached to the PEM 14. For example, the cathode layer 22 is ink-deposited on to the first surface 26 of the PEM 14, and the anode layer 24 is ink-deposited on to the second surface 28 of the PEM. It will be appreciated that the cathode and anode layers 22 and 24 can be attached to the PEM 14 in any other suitable manner. Once attached, the PEM 14 lies in a first plane, a top surface 30 of the cathode layer 22 lies in a second plane that is higher than the first plane, and a bottom surface 32 of the anode layer 24 lie in a third plane that is lower than the first plane. It will be appreciated that the anode layer 24 can be attached to the first surface 26 of the PEM 14, and the cathode layer 22 can be attached to the second surface 28 of the PEM.

Figure 4:
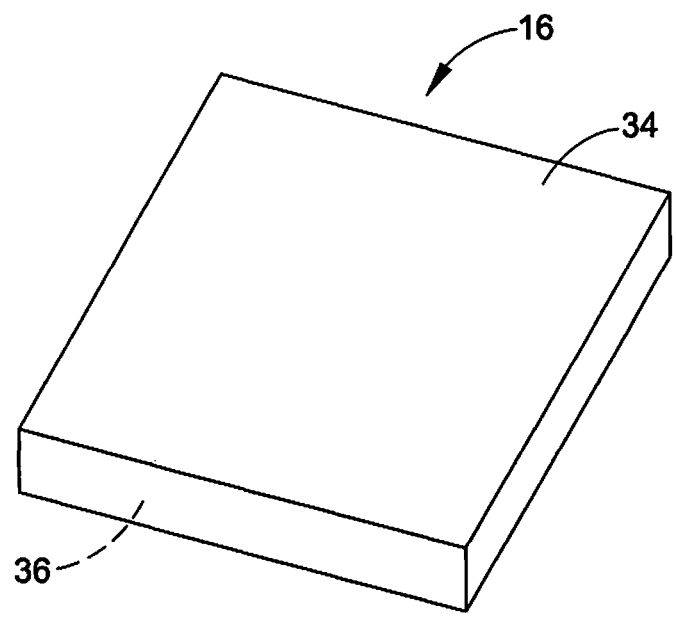
FIG. 4 shows another component of the fuel cell of FIG. 2.

FIG. 4 shows an embodiment of the at least one GDL 16. As shown in FIG. 4, the GDL 16 has a substantially square shape (e.g., a length of approximately 1.32 inches and a width of approximately 1.30 inches). However, the GDL 16 can have any suitable shape (rectangular, circular, elliptical, n-sided polygonal, and the like). It will be appreciated that the GDL 16 has substantially the same dimensions as the cathode and anode layers 22 and 24 of the CCM 12, as described in more detail below. The GDL 16 includes a first surface 34 (e.g., a top surface) and an oppositely disposed second surface 36 (e.g., a bottom surface). The GDL 16 can be substantially planar (i.e., smooth). The GDL 16 is made from porous carbon paper coated with polytetrafluoroethylene (PTFE). However, any suitable material may be used.

Referring back to FIG. 2, and with continuing reference to FIG. 4, the GDL 16 is disposed on at least a portion of the CCM 12. For example, the second surface 36 of the GDL 16 is bonded to the cathode layer 22 or the anode layer 24 of the CCM 12. By having substantially the same dimensions as the cathode and anode layers 22 and 24, the GDL 16 only contacts the corresponding cathode and anode layers 22 and 24, and does not contact any portion of the PEM 14. However, the GDL 16 may contact the PEM 14, where appropriate. In some embodiments, the fuel cell 10 can additionally include a second GDL 16' that is configured to be substantially identical to the GDL 16 described above (i.e., a first GDL). In this example, the second surface 36 of the first GDL 16 is disposed on the top surface 30 of the cathode layer 22, and a bottom surface 36' of the second GDL 16' is disposed on either the bottom surface 32 of the anode layer 24. It will be appreciated that any other suitable adhesive can be used to bond each of the GDLs 16 and 16' to the CCM 12.

Figure 5:
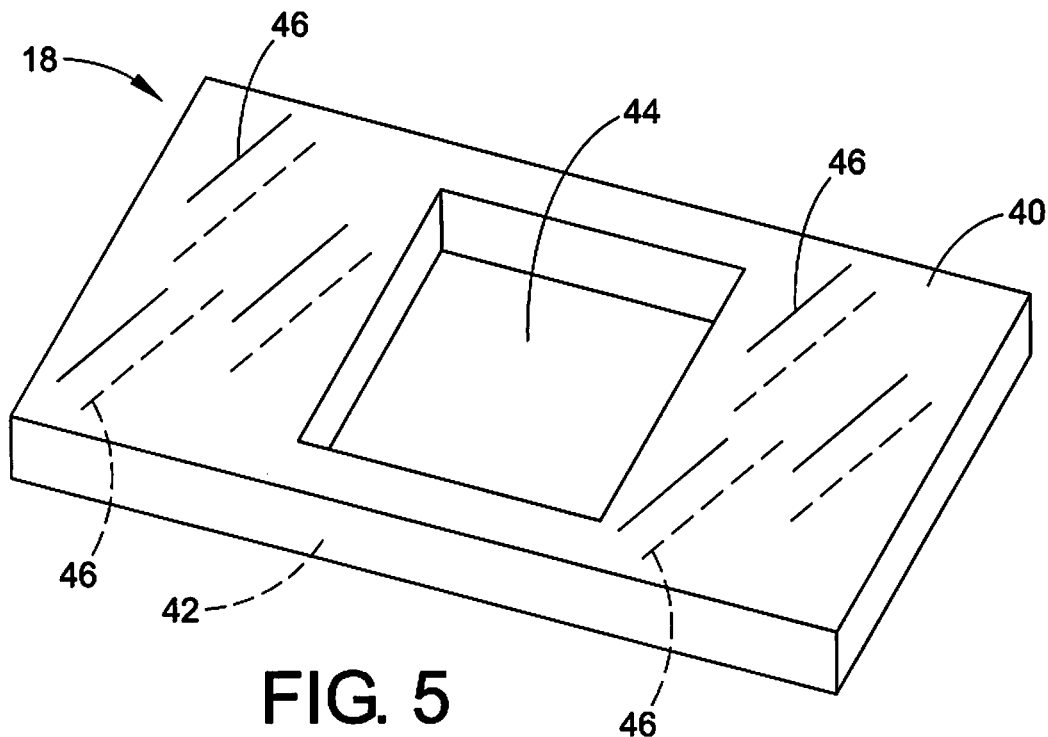
FIG. 5 shows another component of the fuel cell of FIG. 2.

FIG. 5 shows an embodiment of the at least one bonding layer 18. As shown in FIG. 5, the bonding layer 18 has a substantially rectangular shape (e.g., a length of approximately 3.48 inches and a width of approximately 3.00 inches). However, the bonding layer 18 can have any suitable shape (square, circular, elliptical, n-sided polygonal, and the like). The bonding layer 18 includes a first surface 40 (e.g., a top surface) and an oppositely disposed second surface 42 (e.g., a bottom surface). The bonding layer 18 can be substantially planar (i.e., smooth).

Referring back to FIG. 2, and with continuing reference to FIG. 5, the bonding layer 18 is bonded to at least a portion of the PEM 14. In some embodiments, the bonding layer 18 can include a cut-out portion 44 that is sized and dimensioned to receive at least one of the cathode layer 22, the anode layer 24, and the GDL 16 (i.e., by having substantially the same dimensions as the cathode layer, the anode layer, and/or the GDL). For example, the cut-out portion 44 receives the cathode layer 22 (or the anode layer 24) and the GDL 16 so that the bonding layer 18 substantially surrounds the cathode layer (or anode layer) and the GDL. The bonding layer 18 is then positioned so that: (1) the second surface 42 of the bonding layer contacts the first surface 26 of the PEM 14; and (2) the cathode layer 22 (or the anode layer 24) and the GDL 16 is received within the cut-out portion 44 of the bonding layer. The GDL 16 is positioned within the cut-out portion 44 such that the first surface 34 of the GDL lies in a first plane, and the first surface 40 of the bonding layer 18 lies in a second plane that is higher than the first plane by a portion of a height of the bonding layer. Stated another way, the cut-out portion 44 is sized and dimensioned so that the cut-out portion is not "filled in" by the GDL 16, as described in more detail below. In some embodiments, the fuel cell 10 can additionally include a second bonding layer 18' that is configured to be substantially identical to the bonding layer 18 described above (i.e., a first bonding layer). For example, the first bonding layer 18 is bonded to the first surface 26 of the PEM 14; and the second bonding layer 18' is bonded to the second surface 28 of the PEM. The first and second bonding layers 18 and 18' can each be made from a DUPONT PYRALUX® BONDPLY™ layer (available from DuPont, Wilmington Del.). Advantageously, this material provides a laminated seal for the fuel cell 10 to prevent debris and fluid from entering the interior of the fuel cell. The bonding layers 18 and 18' each include a corresponding adhesive layer 46 and 46' that is made from a B-staged acrylic monomer and solvent (available from DuPont). The adhesive layer 46 (and 46') is/are integrally formed into first and second surfaces 40 and 42 (and 40' and 42') of the bonding layer 18 (and 18'). The adhesive layer 46 secures the bonding layer 18 to the first surface 26 of the PEM 14 and a first circuit 20, and the adhesive layer 46' secures the bonding layer 18' to the second surface 28 of the PEM 14 and a second circuit 20', as described in more detail below.

Figure 6:
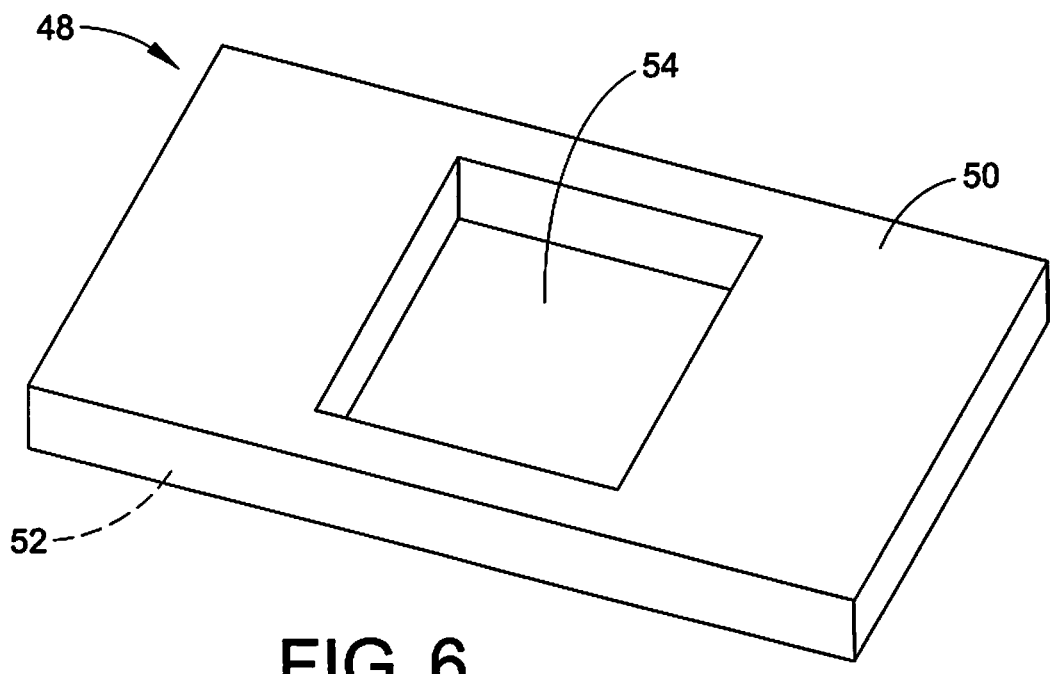
FIG. 6 shows another component of the fuel cell of FIG. 2.

In some embodiments, the fuel cell 10 can include at least one sub gasket layer, which is well-known in the art of fuel cells (see, e.g., U.S. Patent Application Publication No. 2008/0118462, which is incorporated herein in its entirety). FIG. 6 shows an embodiment of a sub gasket layer 48. The sub gasket layer 48 is configured to be inserted between the bonding layer 18 and the PEM 14. As a result, the sub gasket layer 48 can have substantially the same shape and dimensions as the PEM 14 and the bonding layer 18 (e.g., a length of approximately 3.48 inches and a width of approximately 3.00 inches). The sub gasket layer 48 includes a first surface 50 (e.g., a top surface) that contacts the second surface 42 of the bonding layer 18, and an oppositely disposed second surface 52 (e.g., a bottom surface) that contacts the first surface 26 of the PEM 14. The sub gasket layer 48 can be substantially planar (i.e., smooth). In some embodiments, the sub gasket layer 48 can include a cut-out portion 54 that is sized and dimensioned to receive the cathode layer 22, the anode layer 24, and the GDL 16 (i.e., by having substantially the same dimensions as the cathode layer, the anode layer, and/or the GDL). For example, the cut-out portion 54 receives the cathode layer 22, the anode layer 24, and the GDL 16 so that sub gasket layer 48 substantially surrounds the cathode layer, the anode layer, and the GDL. In some embodiments, the at least one sub gasket layer can include a first sub gasket layer 48 disposed between the first bonding layer 18 and the first surface 26 of the PEM 14, and a second sub gasket layer 48' disposed between the second bonding layer 18' and the second surface 28 of the PEM. As such, the adhesive layers 46 and 46' secure the corresponding bonding layers 18 and 18' to the corresponding sub gasket layers 48 and 48'. The sub gasket layers 48 and 48' are each made from a sealant material (described in U.S. Patent Application Publication No. 2008/0118462) to provide cushioning and an additional seal to prevent debris from entering the fuel cell 10.

Figure 7:
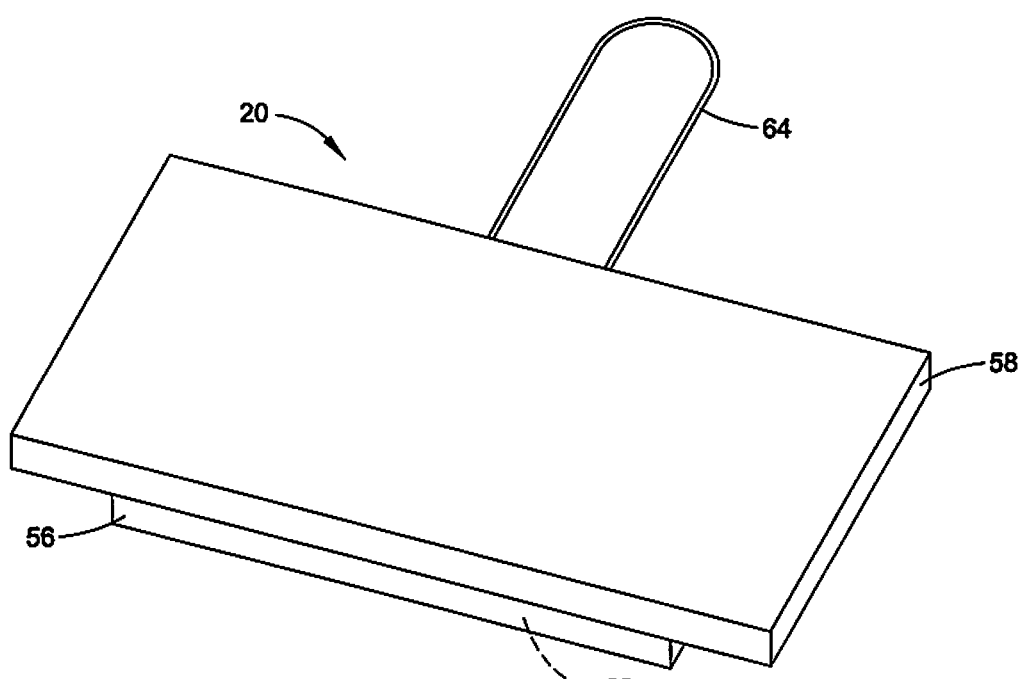
FIG. 7 shows another component of the fuel cell of FIG. 2.

FIG. 7 shows an embodiment of the at least one circuit 20. As shown in FIG. 7, the circuit 20 has a substantially rectangular shape (e.g., a length of approximately 1.319 inches and a width of approximately 1.299 inches). However, the circuit 20 can have any suitable shape (square, circular, elliptical, n-sided polygonal, and the like). It will be appreciated that the circuit 20 has substantially the same dimensions as the CCM 12 and the GDL 16, as described in more detail below.

In some embodiments, the circuit 20 is configured as a flex circuit. It is known in the art that a flex circuit is more flexible, and has a lower weight and area, than a typical circuit (e.g., a printed circuit board). Advantageously, the circuit 20 is configured as a flex circuit to reduce the area and weight of the fuel cell 10. However, it will be appreciated that the circuit 20 can be configured as any other suitable type of circuit. As shown in FIG. 6, the flex circuit 20 includes at least one copper layer 56 and a plastic layer 58 bonded to the at least one copper layer. At least a portion of the copper layer 56 is coated with gold particles to increase the conductivity thereof. For example, the entire copper layer 56 is coated with gold particles to allow the copper layer to act as a current collector for the fuel cell 10, as described in more detail below. The plastic layer 58 is made from polyimide, although any other suitable plastic can be used.

To form the circuit 20, the copper layer 56 and the plastic layer 58 are bonded together. For example, a bottom surface (not shown) of the plastic layer 58 is bonded to a top surface (not shown) of the copper layer 56. As a result, a top surface of the plastic layer 58 constitutes a first (i.e., top) surface 60 of the circuit 20, and a bottom surface of the copper layer 56 constitutes a second (i.e., bottom) surface 62 of the circuit. The plastic layer 58 is disposed on top of the copper layer 56 to act as a seal and protectant from debris and/or fluids. Once formed, the plastic layer 58 extends past opposing ends of the copper layer 56. In addition, once formed, the circuit 20 can be substantially planar (i.e., smooth). As shown in FIG. 7, the circuit 20 also includes a trace 64 extending from a portion of the circuit. The trace 64 is in electrical communication with an external load power collector (not shown in FIG. 7), which collects power that is recycled to the circuit to supply power thereto. It will be appreciated that the circuit 20 can include multiple traces 64.

Referring back to FIG. 2, and with continuing reference to FIG. 7, the circuit 20 is bonded to at least a portion of the GDL 16. For example, the second surface 62 of the circuit 20 is bonded to the first surface 34 of the GDL 16. By having substantially the same dimensions as the GDL 16, the circuit 20 substantially contacts the GDL 16. For example, the circuit 20 "fills in" the remainder of the cut-out portion 44 of the bonding layer 18 that is not filled by the GDL 16. For example, only the copper layer 56 is disposed within the remainder of the cut-out portion 44, while the plastic layer 58 is bonded to the bonding layer 18 (via the adhesive layer 46). As a result, when the circuit 20 is disposed within the cut-out portion 44 of the bonding layer 18, the plastic layer 58 form a first (i.e., top) surface of the fuel cell 10 (not shown in FIG. 7). In addition, the trace 64 contacts the first surface 40 of the bonding layer 18. A graphite adhesive layer 66 is disposed between the first surface 34 of the GDL 16 and the second surface 56 of the circuit 20. The graphite adhesive layer 66 is PELCO® 16050 conductive carbon glue (available from Ted Pella Inc., Redding Calif.). This material is selected to reduce Ohmic contact resistance between the two layers. It will be appreciated that any other suitable adhesive can be used to bond the circuit 20 to the GDL 16. In some embodiments, the fuel cell 10 can additionally include a second circuit 20' that is configured to be substantially identical to the circuit 20 described above (i.e., a first circuit). A bottom surface (not shown) of the second circuit 20' is bonded to the second GDL 16' with a graphite adhesive layer 66' in the manner described above. When the second circuit 20' is bonded to the second GDL 16', a second (i.e., bottom) surface (not shown) of the fuel cell 10 is produced.

Figure 8A:
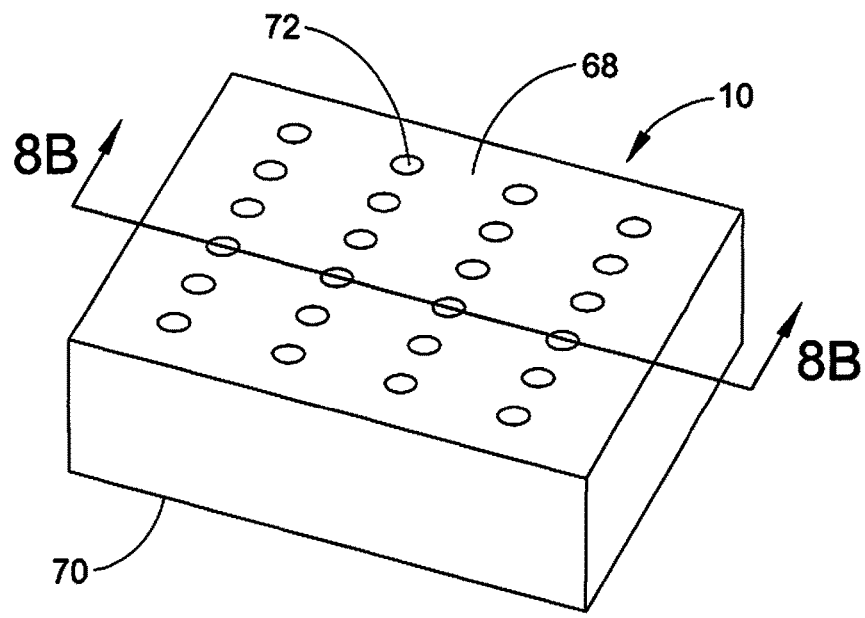
FIG. 8A shows an assembled view of the fuel cell of FIG. 1.
Figure 8B:
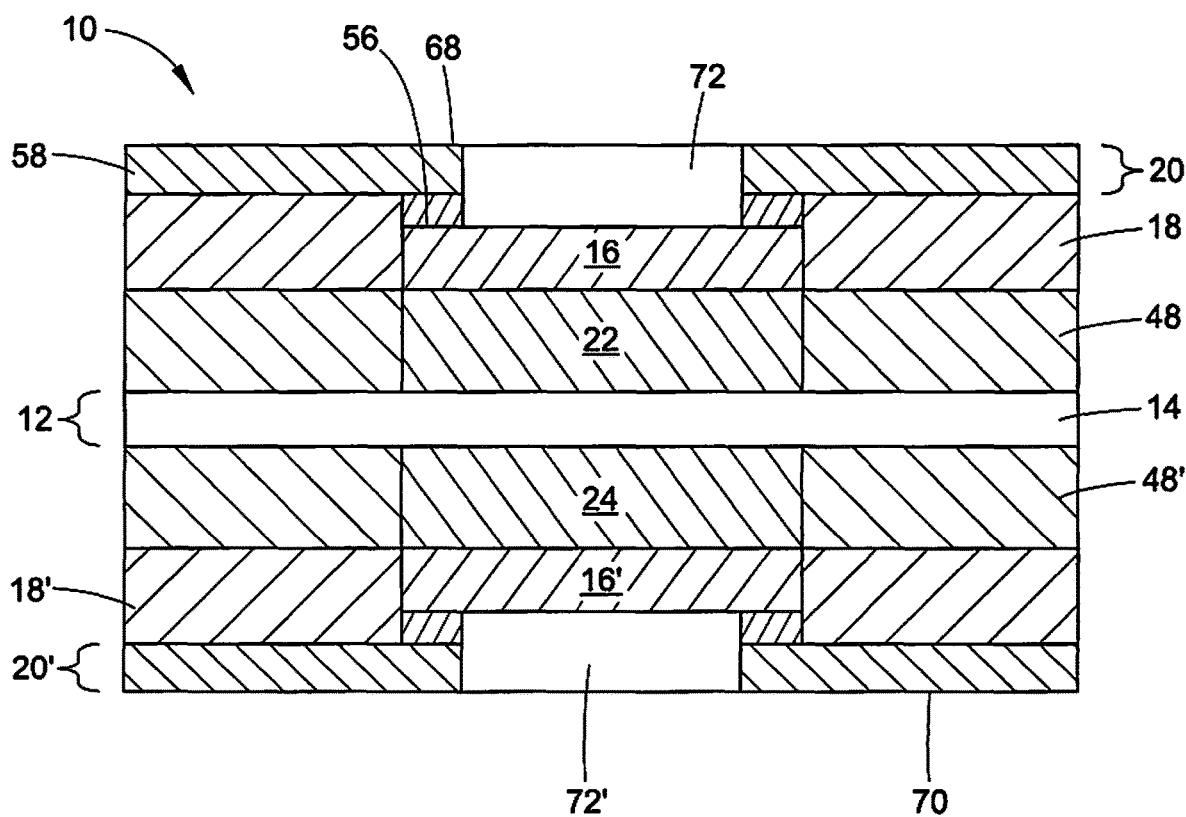
FIG. 8B is a cross-sectional view taken along line 8B-8B of FIG. 8A.

As shown in FIGS. 8A and 8B, once the layers (e.g., the CCM 12, the GDLs 16 and 16', the bonding layers 18 and 18', the circuits 20 and 20', and the sub gasket layers 48 and 48', when included) are stacked and bonded to each other as described above, the layers are attached together to create a single, laminated power-producing fuel cell 10. For example, the CCM 12, the GDLs 16 and 16', the bonding layers 18 and 18', the circuit 20 and 20' (and the sub gasket layers 48 and 48', when included) are subjected to a single hot-press lamination process to form the fuel cell 10. In some examples, the fuel cell 10 can be assembled in a hot-press roll-to-roll lamination process. During the hot press lamination process, the layers of the fuel cell 10 are compressed together. In one example, the GDLs 16 and 16' are compressed into the corresponding cathode and anode layers 22 and 24. As a result, an amount of physical adhesion is produced to the secure the GDLs 16 and 16' to the corresponding cathode and anode layers 22 and 24. This adhesion forms a robust physical contact between the GDLs 16 and 16' to the corresponding cathode and anode layers 22 and 24 to provide electrical contact therebetween. FIG. 8B shows that the GDLs 16 and 16', and the CCM 12, are sealed from an environment by the bonding layers 18 and 18', and the sub gasket layers 48 and 48', when provided. The fuel cell 10 includes a first (i.e., top) surface 68 formed by the first bonding layer 18 and the first circuit 20, and an oppositely disposed second (i.e., bottom) surface 70 formed by the second bonding layer 18' and second circuit 20'. The first and second surfaces 68 and 70 are each substantially planar.

As shown in FIGS. 8A and 8B, at least one hole 72 is included in the fuel cell 10. In some embodiments, the hole 72 is included through the circuit 20 to the GDL 16. Advantageously, the hole 72 "funnels" the reactants (e.g., the oxygen gas, the hydrogen ions from the fuel, and the like) to the GDL 16 so that they reach the CCM 12, thereby ensuring that the corresponding reaction of hydrogen fuel and oxygen gas occurs. The hole 72 has a diameter of approximately 0.0469 inches, and a depth of approximately 0.03125 inches. Although the holes 72 are shown as circular, the holes can have any suitable shape and dimensions to allow the reactants to reach the CCM 12. However, a circular shape of the holes 72 is preferred because of based on cell performance and of fuel cell performance forecasting, ability of reactants to reach the CCM 12, conductor resistance, and manufacturability based on cell performance and of fuel cell performance forecasting, ability of reactants to reach the CCM, conductor resistance, and manufacturability. It will be appreciated that any number of holes 72 can be included in the fuel cell 10. For example, as shown in FIG. 8A, the holes 72 can be arranged as an array over the top surface 68 of the fuel cell 10. It will be appreciated that at least one hole 72' included be formed on the second surface 70 of the fuel cell 10 (i.e., through the second circuit 20' and the second GDL 16' to the CCM 12).

Figure 9A:
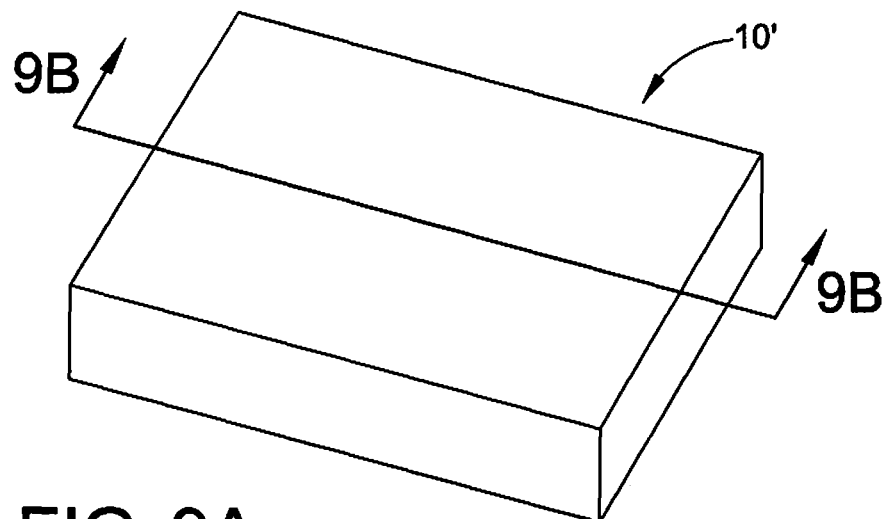
FIG. 9A shows an alternative embodiment of a fuel cell in accordance with another aspect of the present disclosure.
Figure 9B:
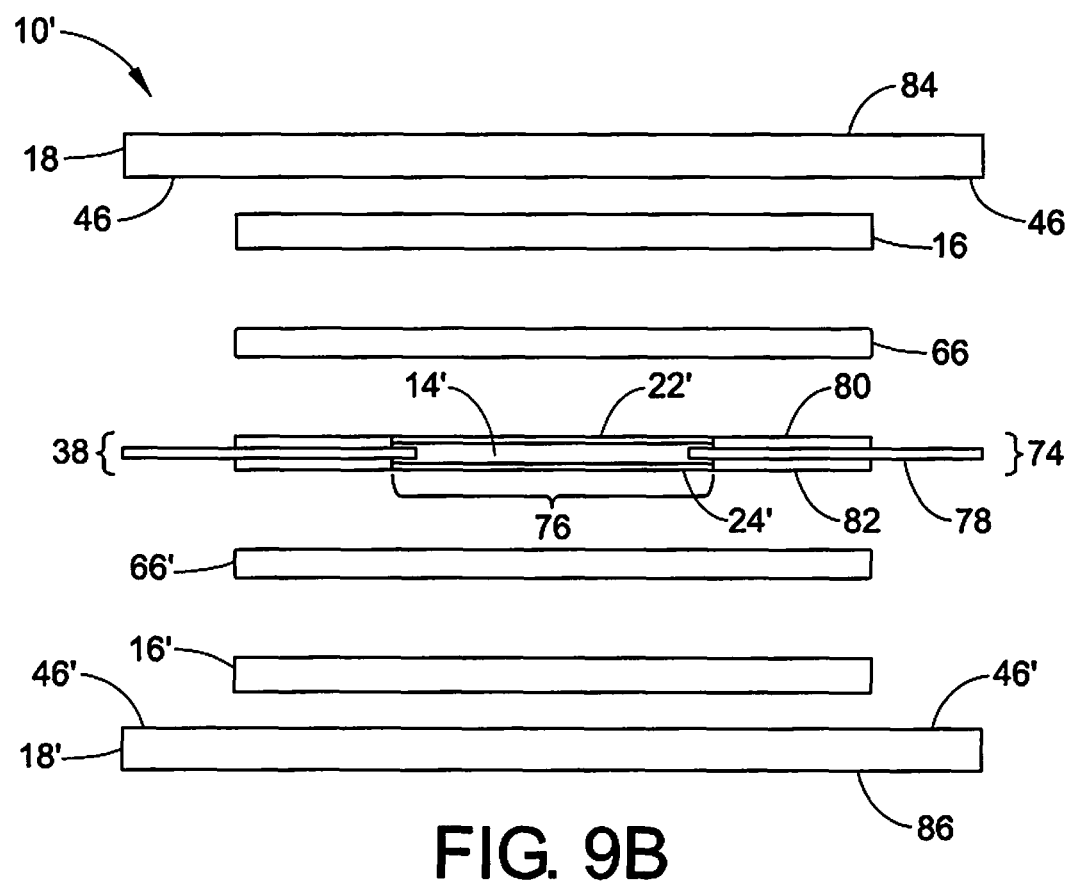
FIG. 9B is a cross-sectional view taken along line 9B-9B of FIG. 9A.

In an alternative embodiment, a fuel cell 10' can be provided. As shown in FIGS. 9A and 9B, the fuel cell 10' is configured substantially identically as the fuel cell 10, except as described below. The fuel cell 10' includes an integrated catalyst coated membrane layer 38 with a circuit 74 and a catalyst coated membrane (CCM) layer 76. The circuit 74 includes a plastic layer 78 that is disposed between first and second copper layers 80 and 82, thereby creating a "double-sided" circuit. As described above, the first and second copper layers 80 and 82 can be coated in gold particles, and the plastic layer 78 can be made of polyimide. Each of the first and second copper layers 80 and 82 can have a height of approximately 0.0007 inches, and plastic layer 78 can have a width of approximately 0.0010 inches. The first and second copper layers 80 and 82 can be bonded to opposing top and bottom surfaces (not shown) of the plastic layer 78 to form the circuit 74. The CCM layer 76 includes a PEM 14', a cathode layer 22', and an anode layer 24'. It will be appreciated that the PEM 14', a cathode layer 22', and an anode layer 24' can each be substantially identically configured as the corresponding PEM 14, cathode layer 22, and anode layer 24' described in regards to the fuel cell 10.

As described above, one or more holes (not shown in FIGS. 9A and 9B) can be formed into the circuit 74. For example, the holes can extend through the first and second copper layers 80 and 82 and the plastic layer 78. The holes are filled with the CCM layer 76. In one example, the CCM 76 is inserted into the hole such that a portion of the plastic layer 78 (i.e., the two "ends" of the plastic layer that are formed when the hole is form) is embedded within a portion of the PEM 14'. Once formed, the circuit 74 and membrane layer 76 are bonded with at least one GDL 16 (or 16') (e.g.,) and at least one bonding layer 18 (and 18'). The first and second bonding layers 18 and 18' define a corresponding planar first (i.e. top) surface 84 and a planar second (i.e., bottom) surface 86 of the fuel cell 10. For example, the GDLs 16 (and 16') are bonded to the cathode and anode layers 22' and 24' (as described with) with PELCO® 16050 conductive carbon glue layers 66 and 66'. The bonding layers 18 (and 18') includes the adhesive 46 (and 46') to bond the bonding layers to opposing surfaces of the PEM 14'. The circuit 74 can be configured as a flex circuit.

Figure 10:
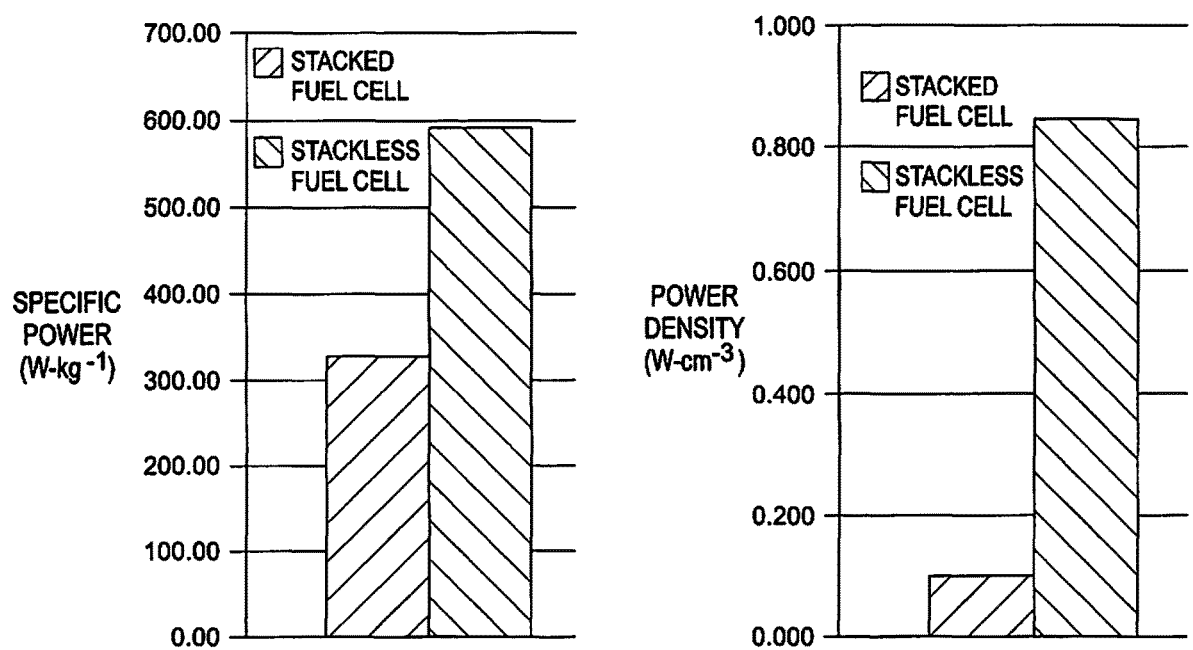
FIG. 10 shows a comparison of data with the fuel cell of FIG. 2 and the typical fuel cell of FIG. 1.

Advantageously, the fuel cells 10 and 10' result in the elimination of many weight driving and power consuming components in the fuel cell system (e.g., pumps, stack components, support beams, and the like). For example, in conventional stacked fuel cell systems, the weight of the CCMs (the only power generating component) constitutes less than 1 of the weight of the fuel cell. When the stack and support components are eliminated, the fuel cell weight could approach the weight of the CCMs alone. A stackless topology could provide the same power as existing fuel cells with a substantial reduction in weight. In addition, as shown in FIG. 10, the stackless configuration of the fuel cell 10 has a considerably higher: (1) specific power than a typical stacked fuel cell (e.g., approximately 600.00 W/kg vs. approximately 325.00 W/kg); and (2) power density than a typical stacked fuel cell (e.g., approximately 0.860 W/cm$^3$ vs. approximately 0.100 W/cm$^3$).

Figure 11:
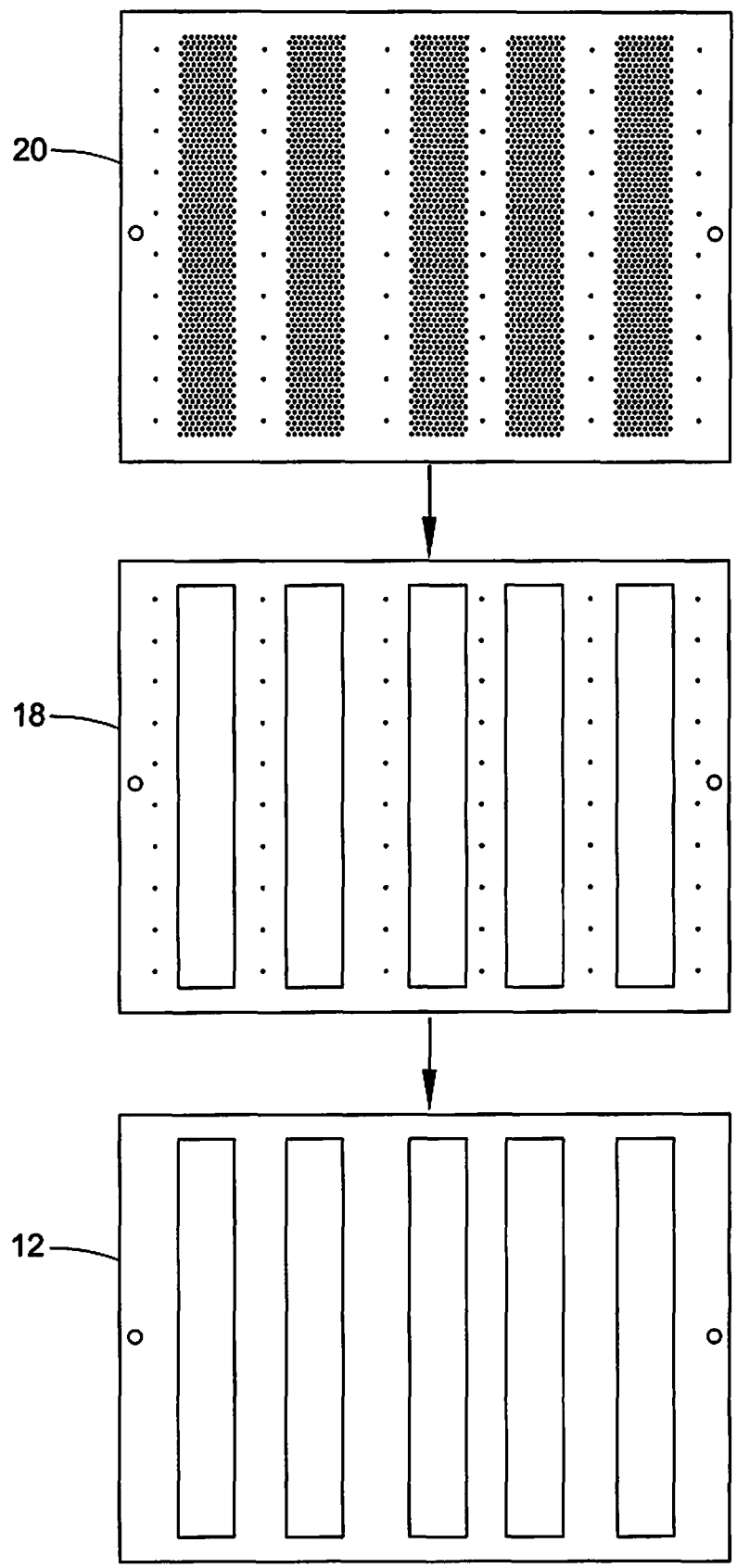
FIG. 11 shows the fuel cell of FIG. 2 with an arrayed configuration.

An additional advantage of the fuel cells 10 and 10' is the reduction in parts and complexity along with case of manufacturing, using manufacturing fixtures and test equipment required for prototype testing. In one example, a total part count for a single laminate fuel cell 10 or 10' is currently at seven (e.g., two circuits 20 and 20'; two GDLs 16 and 16'; two bond layers 18 and 18', and one CCM 12). On the other hand, as shown in FIG. 11, the flex circuits 20 (and 20', or 66 and 66') can be designed with more cells per sheet using form optimization. The same single hot press step can be used to create an entire multi-cell array in a single laminate. This considerably reduces the time and steps required to build a complete fuel cell compared to stacking individual layers as is typically done in a slacked configuration. This process can be repeated for the CCM 12 and the bonding layers 18 (and 18'). As a result, only additional GDLs 16 and 16' would need to be produced to complete the fuel cell 10 (or 10').

Figure 12:
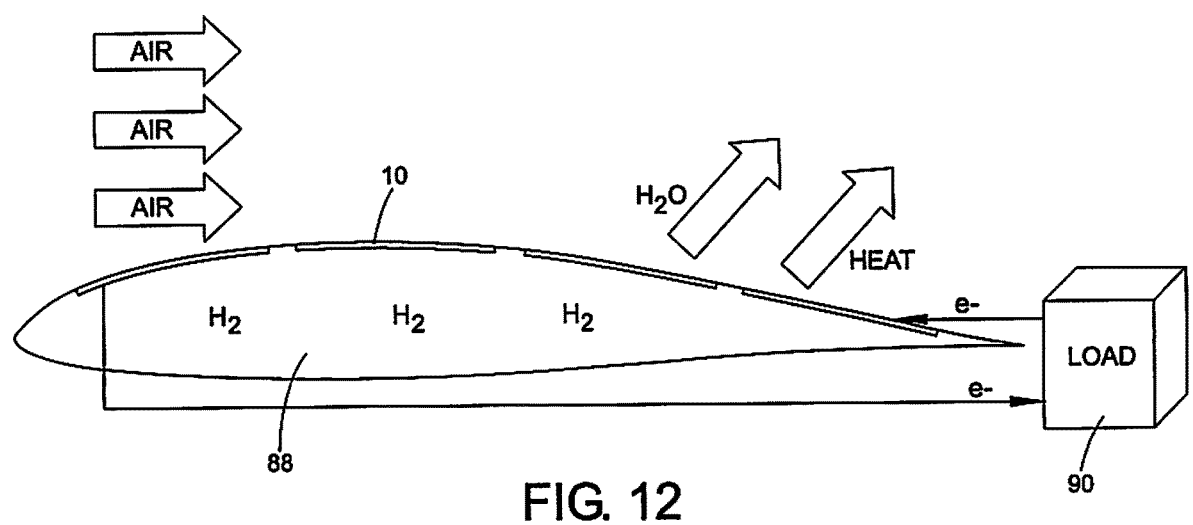
FIG. 12 shows the fuel cell of FIG. 2 in use with a fuel tank.

Advantageously, the arrangement of the fuel cells 10 and 10' provides a simplified manner of ensuring a proper reaction within the fuel cells, as shown in FIG. 12. For example, gaseous hydrogen (H$_2$) is the fuel normally used with typical fuel cells. The fuel cells 10 (or 10') can be mounted (or otherwise attached to) an exterior of a gaseous hydrogen fuel tank 88. The gaseous hydrogen reacts with the cathode and anode layers 22 and 24, which results the following reaction:

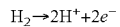

$$H_2 \rightarrow 2H^+ + 2e^-$$

The two generated electrons are circulated to an external load power collector 90, thereby creating a load which drives the reaction and, thus, powers the fuel cell. The hydrogen atoms (i.e., protons) flow from the circuit 20 to the GDL 16, which channels the hydrogen atoms to the CCM 12 and the PEM 14. It will be appreciated that the CCM 12 and the PEM 14 can be considered an "active" component of the fuel cell 10. For example, the CCM 12 and the PEM 14 are each made from a catalytic material to allow a chemical reaction to happen. While the hydrogen gas is reacting at the cathode and anode layers 22 and 24, air (which includes gaseous oxygen O$_2$) flows into the fuel cell 10 (or 10'). When the generated hydrogen ions come in contact with the CCM 12, they react with O$_2$ gas from the air that has flowed to the CCM. The hydrogen atoms of the fuel react with the oxygen of the air according to the equation:

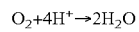

$$O_2 + 4H^+ \rightarrow 2H_2O$$

As a result, water is collected on the CCM 12 and the PEM 14, and is removed accordingly by a pressure gradient. In addition, this reaction generates heat, which is also removed by a temperature gradient. Advantageously, this arrangement allows the internal volume of an aircraft (not shown), that is typically occupied by a larger, heavier typical fuel cell, can be used for larger payloads or fuel storage.

Figure 13:
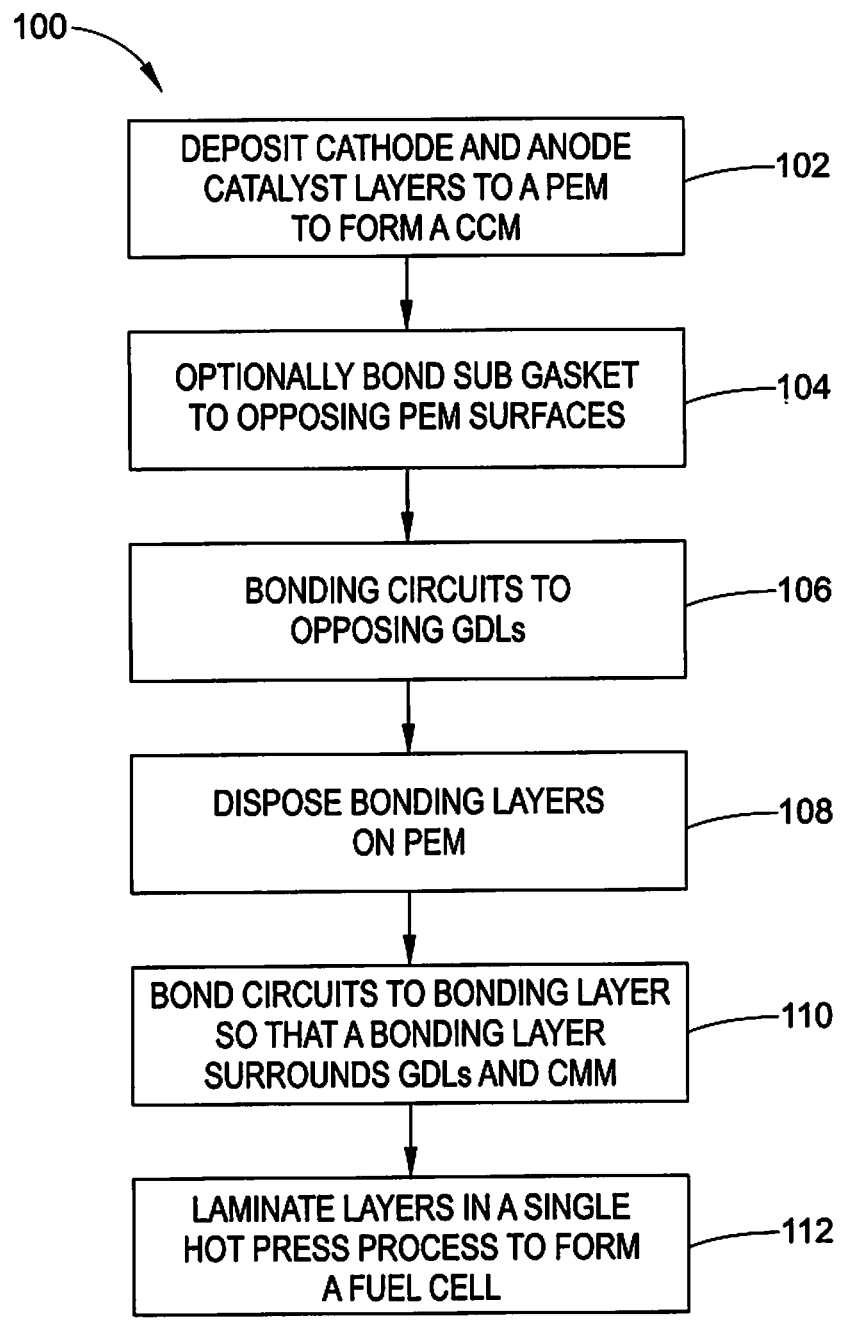
FIG. 13 is a flow chart showing an exemplary method of manufacturing the fuel cell of FIG. 1 in accordance with another aspect of the present disclosure.

FIG. 13 shows an exemplary method 100 of manufacturing the fuel cells 10 and 10'. Although the foregoing is described in regards to the fuel cell 10, it will be appreciated that the method 100 can also be used to manufacture the fuel cell 10'. In addition, unless otherwise indicated hereafter, the components discussed in regards to the method 100 correspond to the components described above. The method 100 includes: depositing a cathode layer 22 and an anode layer 24 on opposing surfaces of a PEM 14 to form a CCM 12 (102); optionally bonding a first sub gasket layer 48 and a second sub gasket layer 48' to opposing surfaces of the PEM such that the sub gasket layers surround the cathode and anode layers (104); bonding a first circuit 20 and a second circuit 20' to opposing surfaces of a corresponding first GDL 16 and a second GDL 16' (106); bonding a first bonding layer 18 and a second bonding layer 18' to opposing surfaces of the PEM with an adhesive layer 46 and 46' such that the bonding layers surround the cathode and anode layers (108); bonding the first and second circuits to the corresponding bonding layers such that the first GDL is disposed on the cathode layer and the second GDL is disposed on the anode layer, and the first and second bonding layers substantially surround the corresponding first and second GDLs (110); and laminating the fuel cell in a single hot press process (112). It will be appreciated that 102-112 can be performed in any suitable order without departing from the present disclosure. For example, the bonding layers 18 and 18' can be bonded the PEM 14 surfaces before the first and second circuits 20 and 20' are bonded to the GDLs 16 and 16'.

Figure 14:
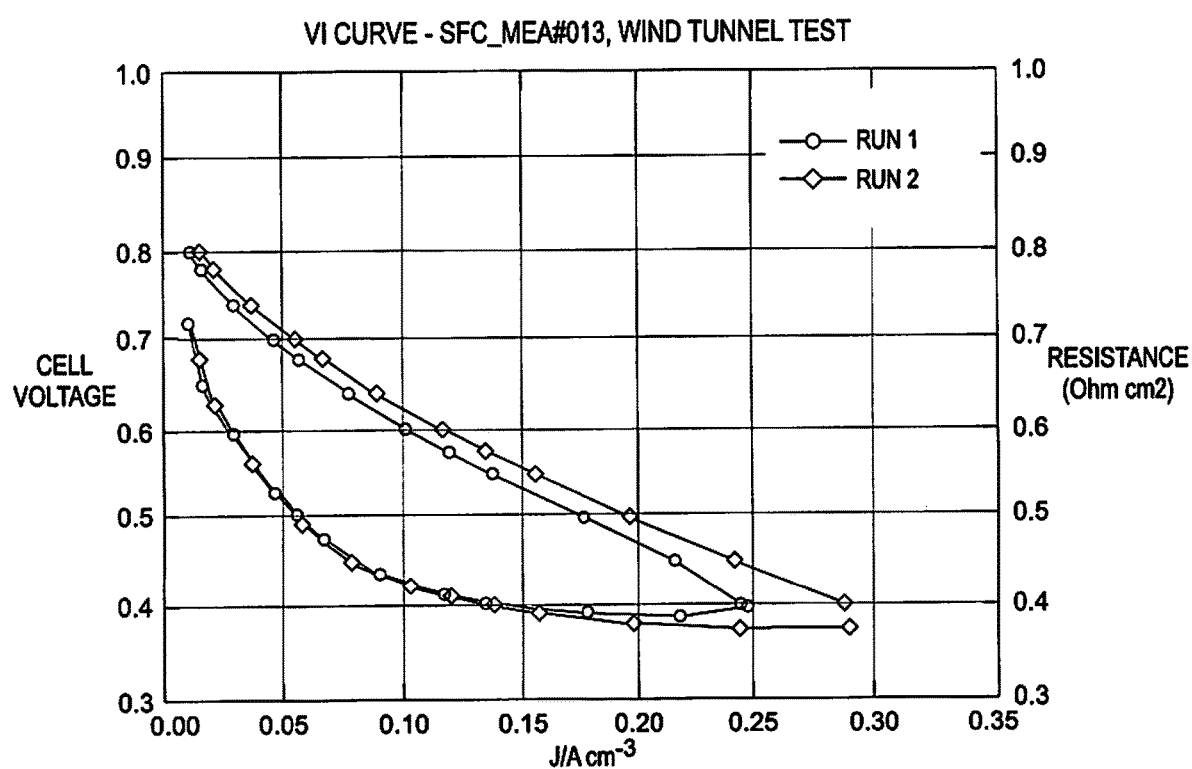
FIG. 14 illustrates a graph showing results of wind tunnel testing of the fuel cell of FIG. 2.

FIG. 14 illustrates a graph showing results of wind tunnel testing. FIG. 14 is a plot of a prototype, stackless fuel cell's polarization behavior. The polarization behavior of a fuel cell, such as the fuel cell 10 or 10', is the meaningful figure of merit describing a fuel cell's performance. FIG. 14 shows that the concept of a stackless fuel is capable of producing meaningful amounts of power at a specific voltage or current density.

The foregoing description of the specific embodiments will so fully reveal the general nature of the disclosure that others can, by applying knowledge within the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments claimed herein and below, based on the teaching and guidance presented herein and the claims which follow:

What is claimed is:

1. A fuel cell, comprising:
 a catalyst coated membrane having:
  a proton exchange membrane;
  a cathode layer disposed on a first surface of the proton exchange membrane; and
  an anode layer disposed on an oppositely disposed second surface of the proton exchange membrane;
 at least one gas diffusion layer bonded to at least one of the cathode and anode layers of the catalyst coated membrane;
 at least one bonding layer substantially surrounding at least one of the catalyst coated membrane and the at least one gas diffusion layer, the at least one bonding layer being bonded to a portion of the proton exchange membrane, and wherein at least one outer edge of the catalyst coated membrane reaches or extends beyond an adjacent outer edge of the at least one bonding layer;
 a conductive adhesive layer adjacent to the gas diffusion layer; and
 at least one circuit bonded by the conductive adhesive layer to a portion of the gas diffusion layer and by the at least one bonding layer to a portion of the catalyst coated membrane.

2. The fuel cell of claim 1, wherein the at least one circuit is a flex circuit that includes at least one gold-coated copper layer and a polyimide layer bonded to the at least one gold-coated copper layer.

3. The fuel cell of claim 1, wherein the at least one bonding layer comprises an adhesive layer that is made from a B-staged acrylic monomer and solvent.

4. The fuel cell of claim 1, further including at least one hole through the at least one circuit and extending to the at least one gas diffusion layer.

5. The fuel cell of claim 1, wherein the catalyst coated membrane, the at least one gas diffusion layer, the at least one bonding layer, and the at least one circuit are formed as a single, laminated power-producing fuel cell.

6. The fuel cell of claim 1, further including at least one sub gasket layer disposed between the proton exchange membrane and the at least one bonding layer, the at least one sub gasket layer substantially surrounding the catalyst coated membrane and the at least one gas diffusion layer, and wherein at least one outer edge of the catalyst coated membrane extends to or beyond an adjacent outer edge of the at least one sub gasket.

7. The fuel cell of claim 1, wherein the at least one gas diffusion layer comprises:
 a first gas diffusion layer bonded to at least a portion of the cathode layer of the catalyst coated membrane; and
 a second gas diffusion layer bonded to at least a portion of the anode layer of the catalyst coated membrane.

8. The fuel cell of claim 7, wherein the at least bonding layer comprises:
 a first bonding layer bonded to at least a portion of a first surface of the proton exchange membrane; and
 a second bonding layer bonded to at least a portion of a second surface of the proton exchange membrane.

9. The fuel cell of claim 8, wherein the at least circuit comprises:
 a first circuit bonded to at least a portion of the first gas diffusion layer and the first bonding layer; and
 a second circuit bonded to at least a portion of a second gas diffusion layer and the second bonding layer.

10. The fuel cell of claim 1, in combination with a second fuel cell, the fuel cells being a single laminate structure.

11. A fuel cell, comprising:
 an integrated catalyst coated membrane layer, including:
  a catalyst coated membrane layer, having
   a proton exchange membrane;
   a cathode catalyst layer formed onto a portion of the proton exchange membrane;
   an anode catalyst layer formed onto a portion of the proton exchange membrane; and
  at least one flex circuit embedded within at least a portion of the proton exchange membrane, the at least flex circuit including at least one gold-coated copper layer and a polyimide layer bonded to the at least one gold-coated copper layer;
 at least one gas diffusion layer disposed bonded to a portion of least one of the cathode layer, the anode layer, and the at least one flex circuit;
 at least one bonding layer substantially surrounding at least one of the integrated catalyst coated membrane and the at least one gas diffusion layer, the at least one bonding layer being bonded to a portion of the proton exchange membrane, and wherein at least one outer edge of the catalyst coated membrane layer reaches or extends beyond an adjacent outer edge of the at least one bonding layer; and
 a conductive adhesive layer disposed between and bonding together the at least one flex circuit and the gas diffusion layer.

12. The fuel cell of claim 11, wherein:
 the at least one gold-coated copper layer includes a first gold-coated copper layer and a second gold-coated copper layer; and
 the first gold-coated copper layer is bonded to a first side of the polyimide layer and the second gold-coated copper layer is bonded to an opposing second side of the polyimide layer.

13. The fuel cell of claim 12, wherein at least one hole is included in the at least one flex circuit, the at least one hole extending through the first gold-coated copper layer, the polyimide layer, and the second gold-coated copper layer.

14. The fuel cell of claim 13, wherein the at least one hole is filled with the integrated membrane layer.

15. A method of manufacturing a fuel cell, the method comprising:
 forming a catalyst coated membrane having a cathode layer and an anode layer attached to opposing surfaces of a proton exchange membrane;
 disposing a conductive adhesive layer between an at least one gas diffusion layer and at least one circuit;
 bonding, with the conductive adhesive layer, the at least one gas diffusion layer to a portion of the at least one circuit;
 bonding at least one bonding layer to a portion of the proton exchange membrane such that the at least one bonding layer substantially surrounds at least one of the cathode layer, and the anode layer;
 bonding the at least one circuit to a portion of the at least one bonding layer such that:
  the at least one gas diffusion layer is disposed on at least one of the cathode layer and the anode layer;
  the at least one bonding layer substantially surrounds the at least one gas diffusion layer; and
  at least one outer edge of the catalyst coated membrane layer reaches or extends beyond an adjacent outer edge of the at least one bonding layer; and
 laminating the fuel cell in a single hot press process.

16. The method of claim 15, wherein the conductive adhesive layer is disposed on the reactive side of the fuel cell.

17. The method of claim 15, further including at least one hole through the at least one flex circuit, the hole extending to the at least one gas diffusion layer.

18. The method of claim 15, further including disposing at least one sub gasket layer between the proton exchange membrane and the at least one bonding layer, the at least one sub gasket layer substantially surrounding the cathode layer, the anode layer, and the at least one gas diffusion layer.

19. The method of claim 15, further including:
  bonding a first gas diffusion layer to at least a portion of the cathode layer;
  bonding a second gas diffusion layer to at least a portion of the anode layer;
  bonding a first bonding layer to at least a portion of a first surface of the proton exchange membrane;
  bonding a second bonding layer to at least a portion of a second surface of the proton exchange membrane;
  bonding a first circuit to at least a portion of the first gas diffusion layer and the first bonding layer; and
  bonding a second circuit to at least a portion of a second gas diffusion layer and the second bonding layer.

* * * * *